(12) United States Patent
Moessinger

(10) Patent No.: US 7,367,998 B2
(45) Date of Patent: May 6, 2008

(54) FILTER ELEMENT AND METHOD FOR PRODUCING IT AND TANK BREATHER FILTER WITH A FILTER ELEMENT OF THIS KIND

(75) Inventor: Klaus Moessinger, Obersulm (DE)

(73) Assignee: ARGO-HYTOS GmbH, Kraichtal (DE)

( * ) Notice: Subject to any disclaimer, the term of this patent is extended or adjusted under 35 U.S.C. 154(b) by 236 days.

(21) Appl. No.: 11/250,164

(22) Filed: Oct. 12, 2005

(65) Prior Publication Data

US 2006/0081634 A1   Apr. 20, 2006

(30) Foreign Application Priority Data

Oct. 15, 2004   (EP) .................. 04024586

(51) Int. Cl.
*B01D 46/00* (2006.01)

(52) U.S. Cl. .................. 55/505; 55/498; 55/502; 55/507; 55/521

(58) Field of Classification Search .................. 55/498, 55/500, 502, 505, 507, 510, 521, DIG. 31; 210/493.5, 494.1, 497.2; 220/371
See application file for complete search history.

(56) References Cited

U.S. PATENT DOCUMENTS

| 311,223 | A | * | 1/1885 | Billings et al. .......... 210/493.5 |
| 1,719,932 | A | * | 7/1929 | Holtson ..................... 220/372 |
| 2,552,279 | A | * | 5/1951 | Houpt ........................ 502/100 |
| 2,823,760 | A | * | 2/1958 | Andersen ..................... 55/313 |
| 3,266,229 | A | * | 8/1966 | Witkowski .................... 55/505 |
| 3,546,853 | A |   | 12/1970 | Claar |
| 3,622,033 | A |   | 11/1971 | Butler et al. |
| 3,731,815 | A | * | 5/1973 | Collingwood et al. ....... 210/496 |
| 3,877,903 | A | * | 4/1975 | Peterson ...................... 55/381 |
| 4,098,177 | A | * | 7/1978 | Olney et al. .................. 99/310 |
| 4,420,094 | A | * | 12/1983 | Chapin ....................... 220/371 |
| 4,619,766 | A | * | 10/1986 | Smiley et al. ............... 210/482 |
| 4,740,296 | A |   | 4/1988 | Roman |
| 4,744,902 | A | * | 5/1988 | Taki et al. ................ 210/493.1 |
| 5,120,439 | A | * | 6/1992 | McFarlin ..................... 210/482 |
| 5,147,540 | A | * | 9/1992 | Hagan ......................... 210/232 |
| 5,924,563 | A | * | 7/1999 | Salyers ....................... 206/223 |
| 6,015,444 | A | * | 1/2000 | Craft et al. ................... 55/320 |
| 6,221,122 | B1 | * | 4/2001 | Gieseke et al. .............. 55/500 |
| 6,258,144 | B1 | * | 7/2001 | Huang ....................... 55/385.3 |
| 6,319,298 | B1 | * | 11/2001 | Ng-Gee-Quan ............. 55/331 |
| 7,048,140 | B1 | * | 5/2006 | Caldwell .................... 220/371 |
| 7,179,315 | B2 | * | 2/2007 | Huang ......................... 55/337 |

FOREIGN PATENT DOCUMENTS

| DE | 10 47 171 | 12/1958 |
| EP | 0 278 080 | 8/1988 |

* cited by examiner

*Primary Examiner*—Duane Smith
*Assistant Examiner*—Robert A Clemente
(74) *Attorney, Agent, or Firm*—Lipsitz & McAllister, LLC

(57) ABSTRACT

The invention relates to a filter element (50), in particular for a tank breather filter (10), the filter element (50) being produced from a flat filter material. To form the filter element (50) in such a way that it can be produced at low cost, it is proposed that it is made in one piece and has an end wall (51), which is surrounded by a corrugated side wall (52) aligned at an angle with respect to the end wall (51). A method for producing a filter element of this kind (50) and a tank breather filter (10) with a filter element of this kind (50) are also proposed.

9 Claims, 3 Drawing Sheets

FILTER ELEMENT AND METHOD FOR PRODUCING IT AND TANK BREATHER FILTER WITH A FILTER ELEMENT OF THIS KIND

The invention relates to a filter element, in particular for a tank breather filter, the filter element being produced from a flat filter material.

The invention also relates to a method for producing a filter element of this kind and to a tank breather filter with a filter element of this kind.

Filter elements are used for filtering a liquid or gaseous medium, for example in the case of tank breather filters, with the aid of which a storage tank for a hydraulic oil can be ventilated. Such tank breather filters are used in hydraulic systems in which hydraulic oil is removed from and supplied to the storage tank as and when required. The filling and emptying of hydraulic cylinders and pressure accumulators of the hydraulic system cause fluctuations of the oil level in the storage tank, making it necessary to use the tank breather filter to allow an exchange of air between the space inside the storage tank and the outside atmosphere. For filtering the air flowing into and out of the storage tank, a filter element produced from a flat filter material is used. For this purpose, the filter material is in many cases folded in a star-shaped manner, the lateral end edges of the folded filter material being adhesively bonded to one another. Subsequently, the filter bellows formed in this way is adhesively bonded at the ends to end plates and then inserted into a housing of the tank breather filter. The production of the filter element as well as the mounting of the tank breather filter involve not inconsiderable production costs.

It is an object of the present invention to form a filter element of the type mentioned at the beginning and a tank breather filter with a filter element of this kind in such a way that they can be produced at low cost.

This object is achieved according to the invention in the case of a filter element of the generic type by the filter element being made in one piece and having an end wall, which is surrounded by a corrugated side wall aligned at an angle with respect to the end wall. A filter element of this kind can be produced in a low-cost manner, by preparing a blank of the flat filter material from which an annular outer region, which surrounds a central inner region of the blank in the circumferential direction, is folded out from the plane of the inner region to one side, thereby forming a corrugated side wall. The production of the filter element consequently takes place by reshaping of the flat filter material, without outside edges of the filter material having to be adhesively bonded to one another or fixed to one another in some other way. The filter element, configured in the manner of a bowl or baking tin, can subsequently be inserted into a housing of the tank breather filter and fixed in it. It has been found that the production costs of the filter element can be reduced as a result.

It is advantageous if the end wall of the filter element is circular and the side wall protruding laterally from it is configured in the form of the lateral surface of a truncated cone. This gives the filter element great mechanical stability and makes it suitable in particular for rotationally symmetrical tank breather filters.

Used in particular as the flat material is a filter paper which is cut to size and subsequently reshaped in such a way as to produce the filter element.

The invention also relates to a method for producing a filter element of this kind, a blank being formed from a filter material and an annular outer region of the blank which surrounds a central inner region of the blank in the circumferential direction being folded out from the plane of the inner region to one side, thereby forming a corrugated side wall. As already explained, this allows a filter element to be produced in a low-cost manner.

It is of advantage if a blank is formed, with a circular inner region and an annular outer region, which is folded out from the plane of the inner region, thereby forming a corrugated side wall.

Filter elements of the aforementioned type are suitable in particular for the filtering of gaseous media, for example for the filtering of air in hydraulic systems.

The invention also relates to a tank breather filter with a housing, which has a tank opening, which can be connected to the tank that is to be ventilated, and a through-opening, which is connected to the surrounding environment, a filter element of the type explained above being disposed between the tank opening and the through-opening. As already explained, it is possible by means of tank breather filters of this kind in particular to equalize the oil level of a storage tank for hydraulic oil by letting air in or out. The tank breather filter is distinguished by allowing low-cost production and mounting, since all that is required for this is to fix the filter element explained above in the housing of the tank breather filter.

The housing of the tank breather filter preferably has a lower housing part, which can be connected to the tank that is to be ventilated, and an upper housing part, the end wall of the filter element lying against the upper housing part and the side wall of the filter element lying against the lower housing part. The two housing parts may, for example, be screwed to one another or be latched to one another, the filter element being inserted into the upper housing part or the lower housing part before the two housing parts are joined together and subsequently fixed by joining together the two housing parts.

A particularly high mechanical load-bearing capacity is achieved in an advantageous embodiment of the tank breather filter by the end wall of the filter element being supported by a support of the lower housing part. The end wall of the filter element can in this way be positioned between the support and the upper housing part.

The filter element is preferably clamped in the housing. This makes it possible to dispense with fixing of the filter element by means of an adhesive layer.

Thus it may be provided, for example, that the filter element is clamped between interacting clamping elements of the upper housing part and the lower housing part. When the upper housing part and the lower housing part are being joined together, the two clamping elements interact in such a way that the filter element is held in non-displaceable manner between them.

The clamping elements preferably clamp a region of the side wall of the filter element in the radial direction. This has the consequence that the filter element is not subjected to any axial loading, i.e. loading perpendicular to the end wall, during the joining together of the two housing parts.

In a particularly preferred embodiment of the tank breather filter according to the invention, the clamping elements accommodate between them an outer border region of the side wall of the filter element. The filter element is consequently clamped in the end region facing away from the end wall.

It is of advantage if the clamping elements are of annular configuration, since this allows an annular region of the side wall of the filter element to be uniformly subjected to a clamping force, by which the filter element within the housing is provided with a high mechanical load-bearing capacity.

The clamping elements are preferably fluted in a way corresponding to the corrugated configuration of the side wall of the filter element. This ensures that the region of the corrugated side wall that is disposed between the clamping elements lies flat against the clamping elements. Consequently, point loading or linear loading by the clamping elements, possibly with an adverse effect on the filter element, can be avoided.

A first clamping element is preferably integrally connected to the lower housing part. This allows low-cost production of the lower housing part including the clamping element. It may be provided that the lower housing part and the first clamping element are produced from a plastics material, in particular from a polyamide, for example a glassfiber-reinforced polyamide.

The second clamping element may be integrally connected to the upper housing part. Alternatively, it may be provided that the second clamping element is formed as a separate component which is fixed to the upper housing part; it is preferably latched to the upper housing part.

The second clamping element and the upper housing part may also be produced from a plastics material, for example from polyamide, in particular from glassfiber-reinforced polyamide.

It is of particular advantage if the second clamping element forms a clamping ring which is connected to the upper housing part by means of bars. The bars may define between them a free space through which the air that is to be filtered by means of the filter element can flow. The bars may be disposed equally spaced apart from one another with respect to the circumference of the clamping ring, having at their end region facing away from the clamping ring engaging elements for the latching to the upper housing part.

The following description of a preferred embodiment of the invention serves for a more detailed explanation in conjunction with the drawing, in which.

Figure 1:
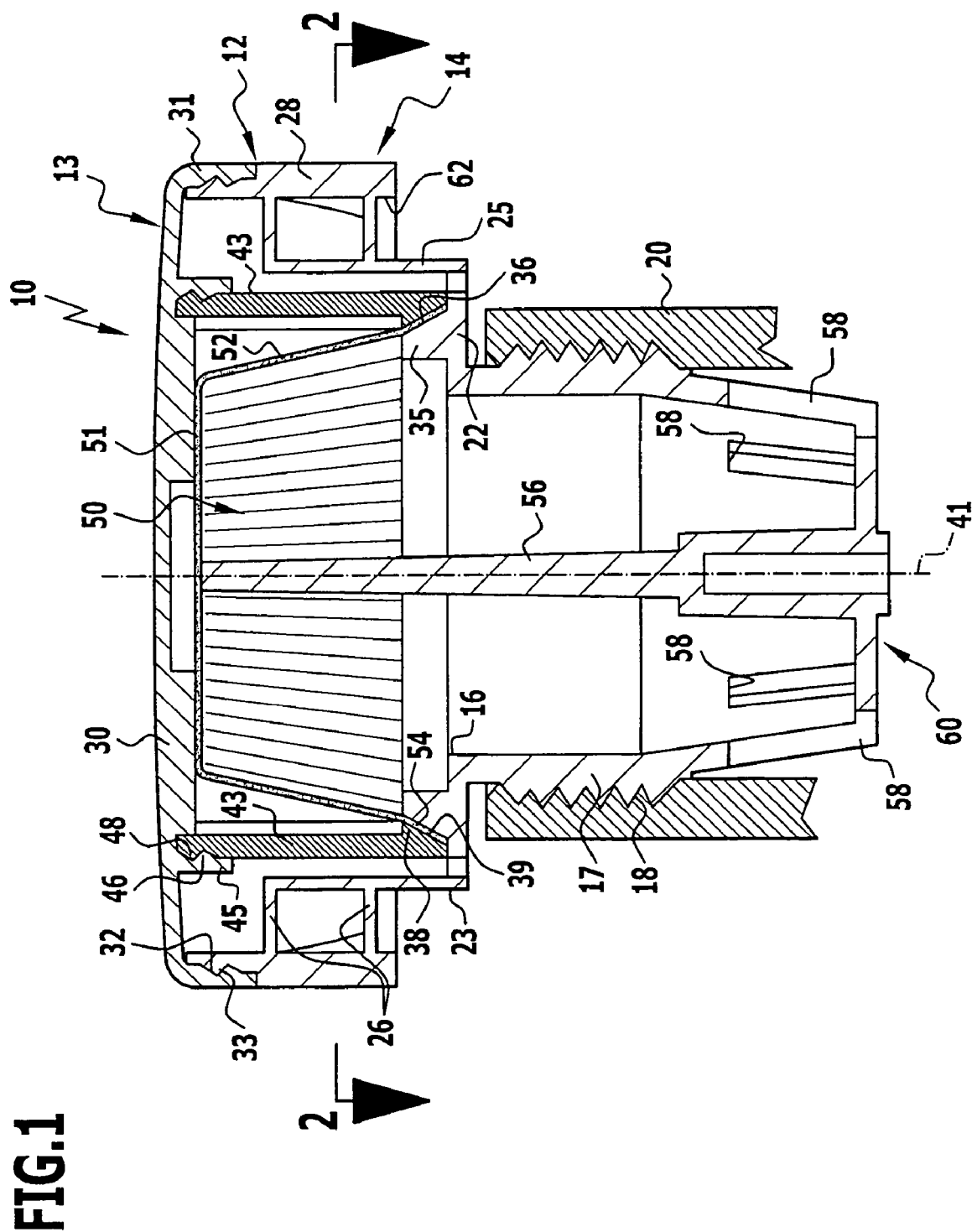
FIG. 1 shows a longitudinal sectional view of a tank breather filter.
Figure 2:
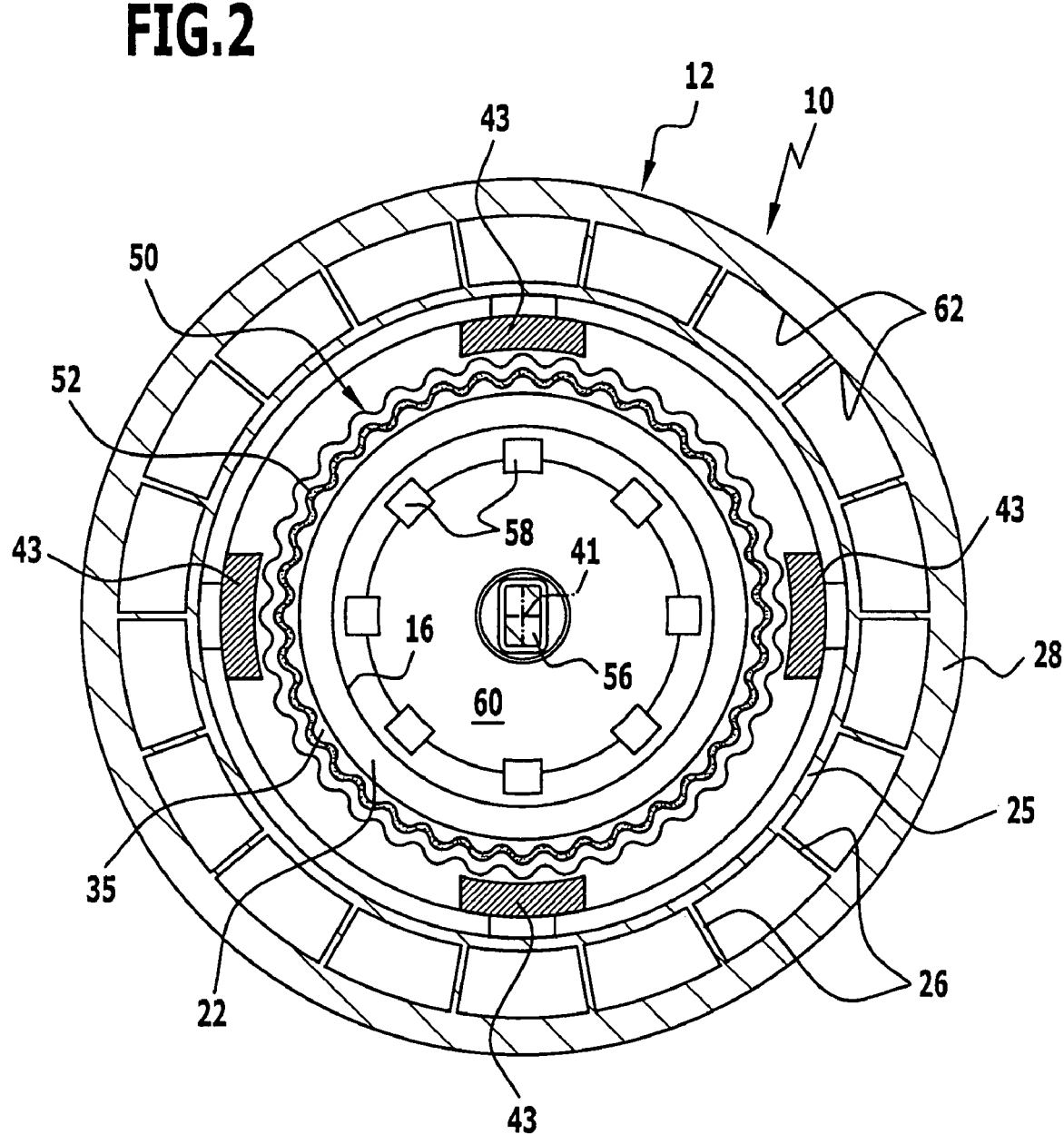
FIG. 2 shows a sectional view along the line 2-2 in FIG. 1.
Figure 3:
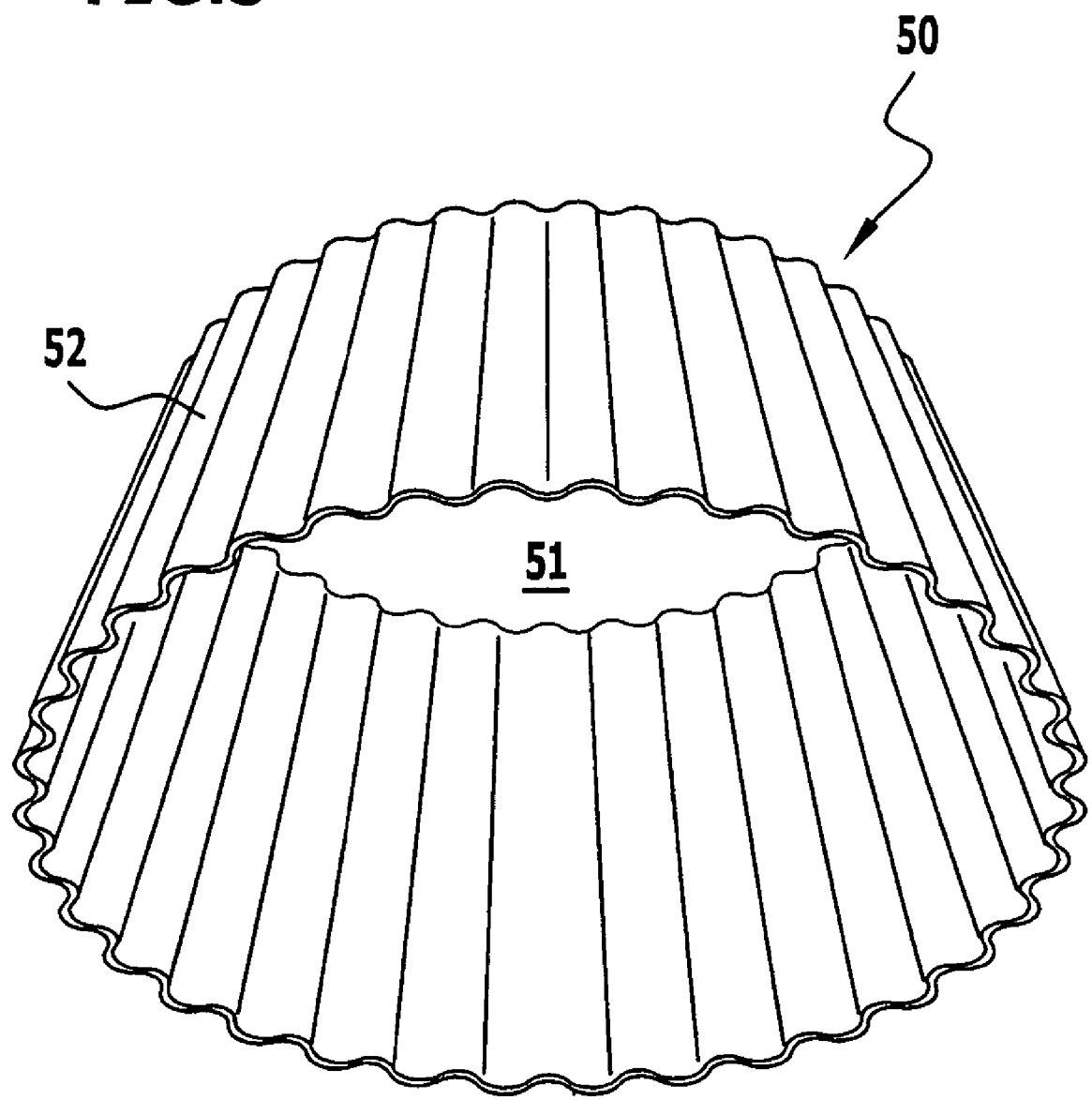
FIG. 3 shows a pictorial representation of a filter element used for the tank breather filter.

In FIGS. 1 and 2, there is illustrated a tank breather filter according to the invention, which is designated as a whole by the reference numeral 10 and is used for ventilating a storage tank for hydraulic oil of a hydraulic system. It comprises a two-part housing 12 produced from glassfiber-reinforced polyamide, with an upper housing part, which forms a cover 13, and with a lower housing part 14, which is configured approximately in the form of a bowl and has a central tank opening 16, which is integrally connected in the direction away from the cover 13 to a tubular connecting piece 17 with an external thread 18, with the aid of which the tank breather filter 10 can be screwed into a connecting piece 20 of a storage tank for hydraulic oil.

The tank opening 16 is formed in a bottom wall 22 of the lower housing part 14. The bottom wall 22 carries on its outer periphery 23 a hollow-cylindrical intermediate wall 25, which is co-linear in relation to the circular tank opening 16 in the direction of the cover 13 and is integrally connected to a hollow-cylindrical outer wall 28 that is co-linear in relation to the intermediate wall 25 by means of a multiplicity of radially extending connecting cross-pieces 26.

The cover 13 has a top wall 30, from which a sleeve 31 protrudes in the direction of the lower housing part 14. The sleeve 31 has on the inside engaging receptacles 32, which are entered by engaging projections 33 formed at the upper end of the outer wall 28, so that the cover 13 is latched to the lower housing part 14 by means of the engaging receptacles 32 and the engaging projections 33.

Formed on the bottom wall 22, on its upper side facing toward the cover 13, is a first clamping ring 35, which tapers conically in the direction of the cover 13 and on the outside forms a fluted first clamping surface 36. The first clamping ring 35 interacts with a second clamping ring 38, which has a likewise fluted, second clamping surface 39, which faces the first clamping surface 36 and is latched to the cover 13 by means of four mounting bars 43 that are formed on the second clamping ring 38 and extend parallel to the center axis 41 of the tank breather filter 10. For this purpose, the cover 13 has on the underside of the top wall 30, facing toward the lower housing part 14, an annular collar 45, which projects in the direction of the lower housing part 14 and on the inside carries engaging elements 46, which interact with engaging elements 48 disposed at the free ends of the mounting bars 43. The second clamping ring 38 can consequently be made to latch in a simple way to the cover 13 by means of the mounting bars 43.

The housing 12 accommodates a filter element 50, which is formed from a filter paper and has a planar end wall 51, which is surrounded in the circumferential direction by a corrugated side wall 52, which is integrally connected to the end wall, is inclined with respect to the plane of the end wall 51 and is aligned in the direction of the lower housing part 14. The end wall 51 lies against the underside of the top wall 30 of the cover 13, and the side wall 52 is clamped by an outer border region 54 between the first clamping surface 36 of the first clamping ring 35 and the second clamping surface 39 of the second clamping ring 38. In its central region, the end wall 51 is supported on its underside, facing toward the lower housing part 14, by a support 56, which is integrally connected to an end cap 60 of the tubular connecting piece 17, end cap 60 having a number of apertures 58. The filter element 50 is consequently held in non-displaceable manner within the housing 12, it being clamped in the radial direction by means of the two clamping rings 35 and 38 and supported in the axial direction on the one hand on the support 56 and on the other hand on the top wall 30.

The lower housing part 14 has in the region between the intermediate wall 25 and the outer wall 28 a multiplicity of through-openings 62, via which ambient air can get into the interior of the housing 12, the air being able to flow through the region of the side wall 52 of the filter element 50 that is not covered by the two clamping rings 35, 38 and subsequently get into the hydraulic tank via the tank opening 16. In the opposite direction, air from the hydraulic tank can pass via the tank opening 16 to the side wall 52 of the filter element, flow through the latter and subsequently escape from the tank breather filter 10 via the through-openings 62.

To produce the filter element 50, all that is required is to produce a circular blank of filter paper and subsequently fold an annular region of the blank, which surrounds a central inner region of the blank in the circumferential direction, out from the plane of the inner region, thereby forming the corrugated side wall 52, while the central inner region forms the planar end wall 51. The filter element 50 formed in this way can subsequently be placed with the outer border region 54 of the side wall 52 onto the second clamping surface 39 of the lower housing part 14, the end wall 51 being supported by the support 56. Subsequently, the cover 13 can be placed onto the lower housing part 14, the first clamping ring 35, which has previously been latched to the cover 13, coming to lie with its first clamping surface 36 externally against the outer border region 54 of the side wall 52, and the cover 13 being latched to the lower housing part 14. This makes the production of the filter element 50 and the mounting of the tank breather filter 10 very simple.

The invention claimed is:

1. Tank breather filter comprising:
   a housing, which has a tank opening, which can be connected to a tank that is to be ventilated, and a through-opening, which is connected to a surrounding environment,
   a filter element clamped in the housing, said filter element being disposed between the tank opening and the through-opening, the filter element being a one-piece filter element produced from a flat filter material and having an end wall, which is surrounded by a corrugated side wall aligned at an angle with respect to the end wall, wherein:
   the housing has a lower housing part adapted to be connected to the tank that is to be ventilated, and an upper housing part, the end wall of the filter element lying against the upper housing part and the side wall of the filter element lying against the lower housing part,
   the filter element is clamped between interacting clamping elements of the upper housing part and the lower housing part, and
   the clamping elements clamp a region of the side wall of the filter element in a radial direction.

2. Tank breather filter according to claim 1, wherein the end wall is supported by a support of the lower housing part.

3. Tank breather filter according to claim 1, wherein the clamping elements are of annular configuration.

4. Tank breather filter according to claim 1, wherein a first clamping element is integrally connected to the lower housing part.

5. Tank breather filter according to claim 1, wherein a second clamping element is formed as a component which can be independently handled and is fixed to the upper housing part.

6. Tank breather filter comprising:
   a housing, which has a tank opening, which can be connected to a tank that is to be ventilated, and a through-opening, which is connected to a surrounding environment,
   a filter element clamped in the housing, said filter element being disposed between the tank opening and the through-opening, the filter element being a one-piece filter element produced from a flat filter material and having an end wall, which is surrounded by a corrugated side wall aligned at an angle with respect to the end wall, wherein:
   the housing has a lower housing part adapted to be connected to the tank that is to be ventilated, and an upper housing part, the end wall of the filter element lying against the upper housing part and the side wall of the filter element lying against the lower housing part,
   the filter element is clamped between interacting clamping elements of the upper housing part and the lower housing part, and
   the clamping elements accommodate between them an outer border region of the side wall.

7. Tank breather filter comprising:
   a housing, which has a tank opening, which can be connected to a tank that is to be ventilated, and a through-opening, which is connected to a surrounding environment,
   a filter element clamped in the housing, said filter element being disposed between the tank opening and the through-opening, the filter element being a one-piece filter element produced from a flat filter material and having an end wall, which is surrounded by a corrugated side wall aligned at an angle with respect to the end wall, wherein:
   the housing has a lower housing part adapted to be connected to the tank that is to be ventilated, and an upper housing part, the end wall of the filter element lying against the upper housing part and the side wall of the filter element lying against the lower housing part,
   the filter element is clamped between interacting clamping elements of the upper housing part and the lower housing part, and
   the clamping elements are fluted.

8. Tank breather filter comprising:
   a housing, which has a tank opening, which can be connected to a tank that is to be ventilated, and a through-opening, which is connected to a surrounding environment,
   a filter element clamped in the housing, said filter element being disposed between the tank opening and the through-opening, the filter element being a one-piece filter element produced from a flat filter material and having an end wall, which is surrounded by a corrugated side wall aligned at an angle with respect to the end wall, wherein:
   the housing has a lower housing part adapted to be connected to the tank that is to be ventilated, and an upper housing part, the end wall of the filter element lying against the upper housing part and the side wall of the filter element lying against the lower housing part,
   the filter element is clamped between interacting clamping elements of the upper housing part and the lower housing part, and
   the second clamping element is latched to the upper housing part.

9. Tank breather filter comprising:
   a housing, which has a tank opening, which can be connected to a tank that is to be ventilated, and a through-opening, which is connected to a surrounding environment,
   a filter element clamped in the housing, said filter element being disposed between the tank opening and the through-opening, the filter element being a one-piece filter element produced from a flat filter material and having an end wall, which is surrounded by a corrugated side wall aligned at an angle with respect to the end wall, wherein:
   the housing has a lower housing part adapted to be connected to the tank that is to be ventilated, and an upper housing part, the end wall of the filter element lying against the upper housing part and the side wall of the filter element lying against the lower housing part,
   the filter element is clamped between interacting clamping elements of the upper housing part and the lower housing part, and
   the second clamping element forms a clamping ring, which is connected to the upper housing part by means of bars.

* * * * *